April 12, 1938. P. J. SPERZEL Re. 20,696

SANITARY SUPPORT FOR TOILET BOWLS

Original Filed July 25, 1935

INVENTOR,
PETER J. SPERZEL
BY HIS ATTORNEYS.
Williamson & Williamson

Reissued Apr. 12, 1938

Re. 20,696

UNITED STATES PATENT OFFICE 20,696

SANITARY SUPPORT FOR TOILET BOWLS

Peter J. Sperzel, Minneapolis, Minn.

Original No. 2,060,698, dated November 10, 1936, Serial No. 33,006, July 25, 1935. Application for reissue June 19, 1937, Serial No. 149,263

12 Claims. (Cl. 4—254)

This invention relates to sanitary supports for use with toilet bowls.

It is the general object of the invention to provide a novel and improved supporting device of cheap and simple construction, which can be used on toilet bowls to support the user in such manner that the danger from infection and disease is reduced to the minimum.

The objects and advantages of the invention will more fully appear from the following description, made in connection with the accompanying drawing, wherein like reference characters refer to the same or similar parts throughout the various views, and, in which, Fig. 1 is a plan view of a water closet bowl equipped with a supporting device of the invention;

Figure 1:
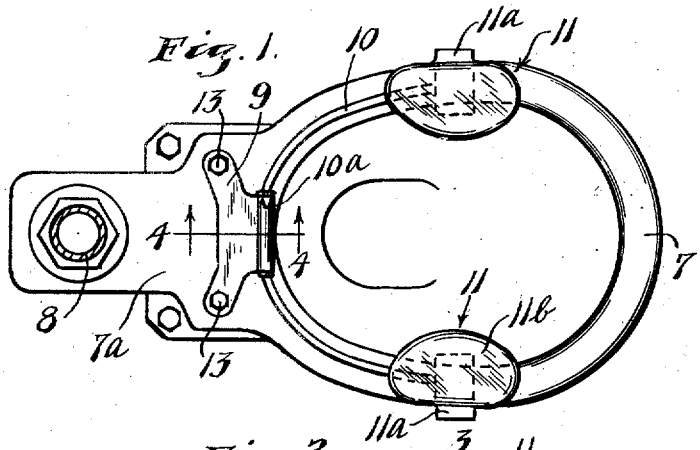
Figure 2:
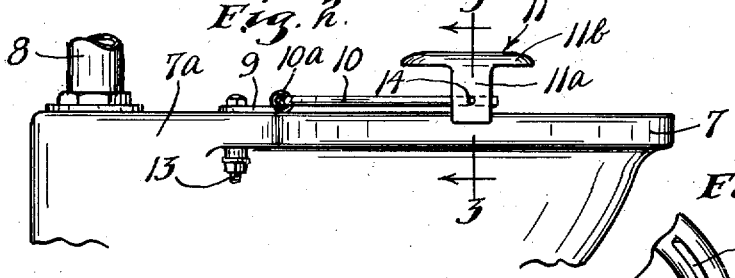
Fig. 2 is a view in side elevation of the supporting device and the upper part of the bowl shown in Fig. 1.
Figure 5:
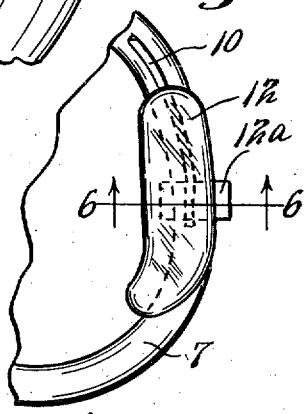
Fig. 5 is a partial plan view looking down on a bowl having applied thereto a supporting device equipped with a slightly modified type of balancer.
Figure 3:
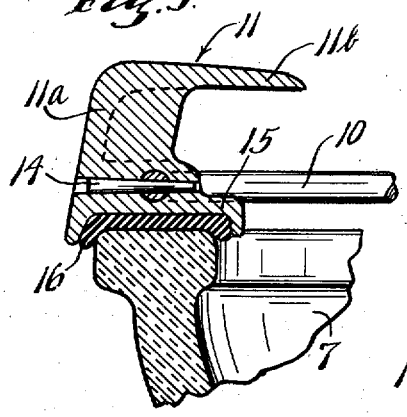
Fig. 3 is a vertical section taken on the line 3—3 of Fig. 2, as indicated by the arrows.
Figure 6:
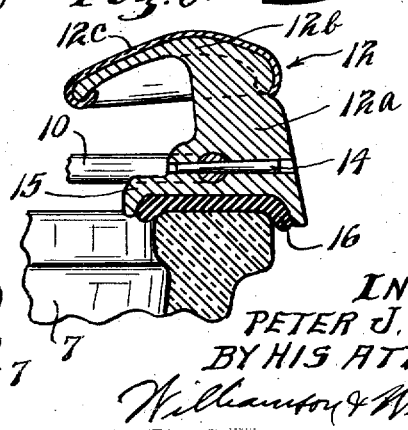
Fig. 6 is a vertical section taken on the line 6—6 of Fig. 5, as indicated by the arrows.
Figure 4:
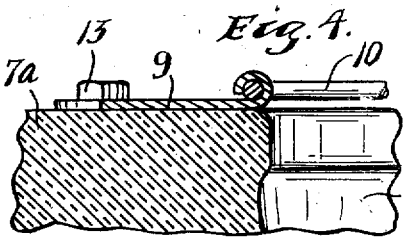
Fig. 4 is a vertical section taken on the line 4—4 of Fig. 1, as indicated by the arrows.

Referring to the drawing, there is illustrated a toilet bowl 7 of the ordinary water closet type. This bowl has a rear portion 7*a* into which a water pipe 8 runs. In accordance with the present invention there is substituted for the usual toilet seat and toilet seat cover a supporting device including hinge bracket 9, yoke 10 and balancers 11, as shown in Figs. 1, 2 and 3, or balancers 12, as shown in Figs. 5 and 6.

The hinge bracket 9 may consist of a flat plate having apertured ears secured as by bolts 13 to the rear portion 7*a* of the toilet bowl. The forward central portion of the hinge bracket 9 is curled upwardly to form a cylindrical eye within which a straight central portion of the yoke 10 is journaled. The yoke 10 may consist of merely a rod bent to U-shape and overlying the top of the bowl 7. The two ends of the U-shaped yoke preferably project forwardly to points slightly beyond the central portion of the bowl.

Balancers 11 include block-like portions 11*a* having apertures in their lower portions through which the forward ends of the yoke 10 extend, the balancers being secured to the yoke by cross pins 14 received within suitable apertures in the block-like portions 11*a* and also received within apertures extending through the forward end portions of the yoke 10. The under surfaces of the block-like portions 11*a* of the balancers are channeled, as best shown in Fig. 3, and they have glued or vulcanized to these channeled portions channel-shaped pads of resilient material, such as rubber. The channels of the pads 15 are of such size as to receive the top portions of the bowl 7 immediately below the balancers. Integrally formed with the block-like portions 11*a* of the balancers 11 and joining these block-like portions at their upper ends are kidney-shaped ledges 11*b* forming opposite supports and the sole supports for persons using the bowl 7.

The ledges 11*b* are flat surfaces, terminating at their edges in rounded portions and they extend inwardly short distances from the block-like portions 11*a*. These ledges are disposed well above the top of the bowl 7 and the upper surfaces of the ledges preferably incline downwardly somewhat toward the center of the bowl from the horizontal.

The balancers shown in Figs. 1, 2 and 3 will preferably be made of metal, reinforced hard rubber, composition material or other material having surfaces which can be highly polished to be easily sterilized and cleaned.

In the form of the device shown in Figs. 5 and 6, balancers 12 are shown which include block-like portions 12*a* receiving the ends of the yoke 10 and secured to the end portions of the yokes by pins 14. These block-like portions 12*a* are channeled like the portions 11*a* of the previously described construction to receive channel-shaped resilient pads 16 similar to the pads 15. Formed integral with and secured to the upper parts of the block-like portions 12*a* are ledges 12*b* covered as by a covering 12*c* of hard rubber or composition material glued or vulcanized to the ledges. The ledges 12*b* are of substantially arcuate-shape, as shown, and preferably project forwardly relative to the bowl 7 beyond the position that the ledges 11*b* of the balancers 11 occupy. The ledges 12*b* and coverings 12*c* may be shaped as shown in Fig. 6, in cross section, so as to afford comfortable supports for the user.

When the supporting device is in use, the body of the person occupying the supporting device will be supported solely by the balancers so that in the case of use of the balancers 11, only the ledges 11*b* of the two opposite balancers will contact the person's body and no portions of the bowl 7 can come in contact with the person's body. In the case of the use of balancers 12, only coverings 12c of the balancers can come in contact with the person's body. As these parts 11b and 12c may be readily sterilized and cleaned, the supporting device can be kept in clean, sanitary condition at all times, so that the danger of communication of infection and disease to the person using the supporting device is held at the minimum.

Of course, the yoke 10 together with the balancer connected thereto may be swung upwardly so that the yoke, under parts of the balancers and the top of the bowl 7 can be easily cleaned and sterilized. If desired, the yoke 10 may be equipped with shoulders 10a at either side of the hinge plate 9 to prevent the possibility of lateral shifting movement of the yoke relative to the hinge plate. The pads 15 or 16 will, of course, absorb any shock imparted to the bowl 7 when the supporting device is lowered.

Use of the supporting device of the present invention eliminates the use of the common infection and disease spreading annular or partially annular toilet seat in common use today and eliminates the need for a backrest or cover. The two balancers used are so located that the person's body is comfortably balanced fore and aft so that the body is stably supported. Although the supporting device is particularly adapted for use in washrooms, it is also admirably adapted for home use. It will be seen that the device is of cheap and simple construction.

It will, of course, be understood that various changes may be made in the form, details, arrangement and proportions of the various parts without departing from the scope of the present invention, which, generally stated, consists of the matter shown and described and set forth in the appended claims.

I claim as my invention:

1. A supporting device to be mounted on a toilet bowl, said device comprising a U-shaped yoke adapted to be hinged to the rear part of a bowl and to normally overlie the top of the bowl and a pair of separate opposed balancers secured to the end portions of said yoke, said balancers having relatively shorter channeled under portions adapted to receive therein parts of the top of the bowl to prevent lateral shifting movement of the balancers, said balancers including ledges adapted to be normally spaced well above the top of a bowl and disposed over but a small portion of the top surface of a bowl and forming substantially the sole supports for a person using the bowl.

2. The structure defined in claim 1 and resilient pads received within said channels between the top of a bowl and said balancers to resiliently support said balancers on a bowl.

3. Means constituting the main support for a person when using a toilet bowl, comprising a pair of opposed individual ledges having relatively small vertical thickness and a relatively small top surface area, block-like portions of lesser length than said ledges, of substantial height and lesser cross sectional area than the top surface area of the ledges below them and adapted to rest on the upper edge of a toilet bowl and a yoke of substantially circular cross section connecting said block-like portions.

4. Means constituting the main support for a person when using a toilet bowl, comprising a yoke of substantially U-shape adapted to be hinged to the rear part of a bowl at the top thereof, a pair of relatively short block-like supports of appreciable height into which the ends of the yoke extend, the under surfaces of said supports being channeled to adapt them for interfitting engagement with the top portions of a bowl and a pair of ledges of generally kidney shaped contour on the respective block-like supports adapted to be positioned a substantial distance above the top edge of a bowl by said supports, said ledges covering a relatively small portion only of the top edge.

5. Means adapted to constitute the main support for a person using a toilet bowl, comprising a pair of separate ledges of relatively small and generally oval surface contour, supporting-blocks below the respective ledges of lesser cross sectional area and having relatively small-area contact surfaces adapted to engage the upper edge of a toilet bowl and a yoke adapted to be hingedly secured at its mid portion to a toilet bowl and having end portions interfitting with the supporting blocks to preclude tilting movement of the ledges longitudinally of the bowl.

6. Means adapted to constitute the main support for a person when using a toilet bowl, comprising a pair of ledges having a small surface area compared to that of the top surface of the bowl, supports beneath the respective ledges of still smaller area but having an appreciable height to raise the top surface of the ledges a substantial distance above the upper edge of a toilet bowl, said ledges overhanging the supports inwardly of a toilet bowl and a yoke having its end portions only interfitting with the respective supports.

7. Means adapted to constitute the main support for a person when using a toilet bowl, comprising a pair of opposed relatively short separate balancers of substantially T-shape longitudinally of a bowl, resilient pads having interfitting engagement with the bottom ends of said balancers and adapted to engage the upper edge of a toilet bowl and a yoke connecting said balancers and having a straight central portion adapted to constitute part of a hinge for mounting said means on a toilet bowl.

8. Means adapted to constitute the main support for a person when using a toilet bowl, comprising relatively short individual ledges of generally oval contour and shorter relatively tall supports therebeneath adapted to engage the upper edge of a toilet bowl, a yoke of substantially U-shape adapted to be hingedly supported on a toilet bowl and having end portions interfitting with the supports adapted to prevent tilting movement of the ledges longitudinally of a bowl and means in the supports engaging the respective supports and end portions of the yoke to hold the supports on the yoke and to prevent transverse tilting movement of the ledges on the yoke and on the bowl.

9. A device as set forth in claim 6 in which the yoke has a hinge thereon at its mid-portion for pivotal mounting on a toilet bowl, the yoke having additional means cooperating with the hinge to prevent lateral shifting of the yoke relatively to the hinge.

10. Means adapted to constitute the main support for a person when using a toilet bowl, comprising separate relatively short ledges and shorter supports of appreciable height therebeneath adapted to engage the upper edge of a toilet bowl, a yoke of substantially U-shape adapted to be hingedly supported on a toilet bowl and having end portions interfitting with the supports adapted to prevent tilting movement of the ledges longitudinally of a bowl and cross pins in the supports extending into the end portions of the yoke to hold the supports on the yoke and to prevent transverse tilting movement of the ledges on the yoke and on the bowl.

11. Means constituting the main support for a person using a toilet bowl, comprising a pair of relatively short separate opposed ledges, shorter block-like portions on the underside of the respective ledges adapted to rest on the upper edge of a toilet bowl, each block-like portion being of substantial height to raise the ledges an appreciable distance above the upper edge of a bowl, the upper person-engaging surface of the several ledges comprising a covering of a composition material and the bottom surface of the respective block-like portions comprising a pad of resilient material.

12. Means adapted to constitute the main support for a person when using a toilet bowl, comprising a pair of opposed separate balancers of substantially T-shape covering only a relatively small longitudinal extent of a toilet bowl adapted to have small-area surface contact with the top edge of a toilet bowl to be supported thereby, the top surfaces of the balancers comprising a layer of composition material, the other parts being of metal, both materials having highly polished outer surfaces to be easily cleaned and sterilized.

PETER J. SPERZEL.